US009213631B2

(12) United States Patent
Chu

(10) Patent No.: US 9,213,631 B2
(45) Date of Patent: Dec. 15, 2015

(54) DATA PROCESSING METHOD, AND MEMORY CONTROLLER AND MEMORY STORAGE DEVICE USING THE SAME

(75) Inventor: Chien-Hua Chu, Hsinchu County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 408 days.

(21) Appl. No.: 13/555,206

(22) Filed: Jul. 23, 2012

(65) Prior Publication Data

US 2013/0304964 A1 Nov. 14, 2013

(30) Foreign Application Priority Data

May 11, 2012 (TW) .............................. 101116931 A

(51) Int. Cl.
*G06F 12/00* (2006.01)
*G06F 12/02* (2006.01)

(52) U.S. Cl.
CPC ........ *G06F 12/0246* (2013.01); *G06F 12/0238* (2013.01); *G06F 2212/7201* (2013.01)

(58) Field of Classification Search
CPC ..................... G06F 12/0246; G06F 2212/7201
USPC ........................................ 711/103; 707/755
See application file for complete search history.

(56) References Cited

U.S. PATENT DOCUMENTS

| 2010/0023682 | A1* | 1/2010 | Lee et al. ...................... 711/103 |
| 2012/0144093 | A1* | 6/2012 | Steiner et al. ................. 711/103 |
| 2013/0304964 | A1* | 11/2013 | Chu .............................. 711/103 |
| 2014/0013030 | A1* | 1/2014 | Yeh .............................. 711/103 |

FOREIGN PATENT DOCUMENTS

| CN | 1795437 | 6/2006 |
| CN | 101107673 | 1/2008 |

* cited by examiner

*Primary Examiner* — Reginald Bragdon
*Assistant Examiner* — Mehdi Namazi
(74) *Attorney, Agent, or Firm* — Jianq Chyun IP Office

(57) ABSTRACT

A data processing method for a re-writable non-volatile memory module is provided. The method includes receiving a write data stream associating to a logical access address of a logical programming unit; selecting a physical programming unit; and determining whether the write data stream associates with a kind of pattern. The method includes, if the write data stream associates with the kind of pattern, setting identification information corresponding to the logical access address as an identification value corresponding to the pattern, and storing the identification information corresponding to the logical access address into a predetermined area, wherein the write data stream is not programmed into the selected physical programming unit. The method further includes mapping the logical programming unit to the physical programming unit. Accordingly, the method can effectively shorten the time for writing data into the re-writable non-volatile memory module.

23 Claims, 10 Drawing Sheets

DATA PROCESSING METHOD, AND MEMORY CONTROLLER AND MEMORY STORAGE DEVICE USING THE SAME

CROSS-REFERENCE TO RELATED APPLICATION

This application claims the priority benefit of Taiwan application serial no. 101116931, filed on May 11, 2012. The entirety of the above-mentioned patent application is hereby incorporated by reference herein and made a part of this specification.

BACKGROUND

1. Technology Field

The present invention relates to a data processing method for a rewritable non-volatile memory module, and a memory controller and a memory storage device using the same.

2. Description of Related Art

Digital cameras, cell phones, and MP3 players have undergone rapid growth in recent years, so that consumer demands for storage media have also rapidly increased. Since a rewritable non-volatile memory (for example, a flash memory) has characteristics such as data non-volatility, low power consumption, small volume, and non-mechanical structure, etc., it is suitable for various aforementioned portable multimedia devices.

Typically, the rewritable non-volatile memory includes a plurality of physical erasing units, and each physical erasing unit includes a plurality of physical programming units. Therein, a physical programming unit is the minimum unit for writing data. Accordingly, when the size of the data to be written is smaller than the capacity of the physical programming unit, a memory control circuit generally fills a pad value, e.g. "0", in bits of the physical programming unit where the data is not written in, such that the entire physical programming unit is used as an unit for a programming operation. However, when transmitting such pad value to the rewritable non-volatile memory for the programming operation, the time for performing a write command would additionally increased. Besides, a host system creates and maintains system data (e.g. a file allocation table) in a portion of storing addresses in a storage device to manage storage spaces of the entire storage device and records regularly constant specific values (such as "0") in a portion fields in the system data. Thus, the memory control circuit would repeatedly write and read the constant specific values. However, as the capacity of the physical programming unit becomes larger, the time required to perform the programming operation also increases. How to effectively process the data to be written to shorten the necessary time has become one of the major issues to technicians in this field.

SUMMARY

The present invention is directed to a data processing method, a memory controller, a memory storage device that can effectively shorten the time for performing a write and a read operation.

An exemplary embodiment of the present invention provides a data processing method for a re-writable non-volatile memory module having a plurality of physical programming units. Each of the physical programming units includes a data bit area and a redundancy bit area, and the data bit area includes a plurality of physical access addresses. A plurality of logical programming units is configured to be mapped to at least a portion of the physical programming units, and each the logical programming units has a plurality of logical access addresses. The data processing method includes receiving a first write data stream, wherein the first write data stream is about to be stored into a first logical access address, and the first logical access address associates with a first logical programming unit. The data processing method also includes selecting a first physical programming unit and determining whether the first write data stream associates with a pattern. The data processing method still includes, if the first write data stream does not associate with the pattern, setting identification information corresponding to the first logical access address as a default value, programming the first write data stream into the first logical access address in the data bit area of the first physical programming unit and storing the identification information corresponding to the first logical access address in a predetermined area. The data processing method yet includes, if the first write data stream associates with the pattern, setting the identification information corresponding to the first logical access address as an identification value corresponding to the pattern and storing the identification information corresponding to the first logical access address in the predetermined area, wherein the first write data stream is not programmed into the first physical programming unit. The data processing method further includes mapping the first logical programming unit to the first physical programming unit.

An exemplary embodiment of the present invention provides a data processing method for a re-writable non-volatile memory module having a plurality of physical programming units. Each of the physical programming units includes a data bit area and a redundancy bit area, and the data bit area includes a plurality of physical access addresses. A plurality of logical programming units is configured to be mapped to at least a portion of the physical programming units, and each the logical programming units has a plurality of logical access addresses. The data processing method includes receiving a first write data stream from a host system, wherein the first write data stream is about to be stored into a first logical access address, and the first logical access address associates with a first logical programming unit. The data processing method also includes selecting a first physical programming unit and determining whether the first write data stream associates with one of a plurality of patterns. The data processing method still includes, if the first write data stream does not associate with any one of the plurality of patterns, setting identification information corresponding to the first logical access address as a default value, programming the first write data stream into the first logical access address in the data bit area of the first physical programming unit and programming the identification information corresponding to the first logical access address into the redundancy bit area of the first physical access address. The data processing method yet includes, if the first write data stream associates with on of the multiple patterns, setting the identification information corresponding to the first logical access address as an identification value corresponding to the pattern and programming the identification information corresponding to the first logical access address into the redundancy bit area of the first physical access address, wherein the first write data stream is not programmed into the first physical programming unit.

An exemplary embodiment of the present invention provides a memory controller for a re-writable non-volatile memory module having a plurality of physical programming units. Each of the physical programming units includes a data bit area and a redundancy bit area, and the data bit area includes a plurality of physical access addresses. The memory controller includes a host interface, a memory interface and a memory management circuit. The host interface is configured to be coupled to a host system. The memory interface is configured to be coupled to a rewritable non-volatile memory module. The memory management circuit is coupled to the host interface and the rewritable non-volatile memory module and configures a plurality of logical programming units for mapping to at least a portion of the plurality of physical programming units, wherein each of the logical programming units has a plurality of logical access addresses. Herein, the memory management circuit receives a first write data stream from the host system, wherein the first write data stream associates with a first logical access address, and the first logical access address associates with a first logical programming unit. Besides, the memory management circuit selects a first physical programming unit and determines whether the first write data stream associates with a pattern. If the first write data stream does not associate with the pattern, the memory management circuit sets identification information corresponding to the first logical access address as a default value, programs the first write data stream into a first physical access address in the data bit area of the first physical programming unit and stores the identification information corresponding to the first logical access address in a predetermined area. If the first write data stream associates with the pattern, the memory management circuit sets the identification information corresponding to the first logical access address as an identification value corresponding to the pattern and stores the identification information corresponding to the first logical access address in the predetermined area, wherein the first write data stream is not programmed into the first physical programming unit. In addition, the memory management circuit is configured to map the first logical programming unit to the first physical programming unit.

An exemplary embodiment of the present invention provides a memory storage device including a connector, a rewritable non-volatile memory module and a memory controller. The connector is configured to be coupled to a host system. The rewritable non-volatile memory module includes a plurality of physical programmed blocks. Each of the physical programming units has a data bit area and a redundancy bit area, and the data bit area includes a plurality of physical access addresses. The memory controller is coupled to the connector and the rewritable non-volatile memory module and configures a plurality of logical programming units to be mapped to at least a portion of the physical programming units, wherein each of the plurality of logical programming units has a plurality of logical access addresses. Herein, the memory controller receives a first write data stream form the host system, wherein the first write data stream is about to be stored into a first logical access address, and the first logical access address associates with a first logical programming unit. Additionally, the memory controller selects a first physical programming unit and determines whether the first write data stream associates with a pattern. If the first write data stream does not associate with the pattern, the memory controller sets identification information corresponding to the first logical access address as a default value, programs the first write data stream into a first physical access address in the data bit area of the first physical programming unit and stores the identification information corresponding to the first logical access address in a predetermined area. If the first write data stream associates with the pattern, the memory controller sets the identification information corresponding to the first logical access address as an identification value corresponding to the pattern and stores the identification information corresponding to the first logical access address in the predetermined area, wherein the first write data stream is not programmed into the first physical programming unit. Moreover, the memory controller is configured to map the first logical programming unit to the first physical programming unit.

An exemplary embodiment of the present invention provides a memory storage device including a connector, a rewritable non-volatile memory module and a memory controller. The connector is configured to be coupled to a host system. The rewritable non-volatile memory module includes a plurality of physical programmed blocks. Each of the physical programming units has a data bit area and a redundancy bit area, and the data bit area includes a plurality of physical access addresses. The memory controller is coupled to the connector and the rewritable non-volatile memory module and configures a plurality of logical programming units for mapping to a portion of the physical programming units, wherein each of the plurality of logical programming units has a plurality of logical access addresses. Herein, the memory controller receives a first write data stream from the host system, wherein the first write data stream associates with a first logical access address, and the first logical access address associates with a first logical programming unit. Moreover, the memory controller selects a first physical programming unit and determines whether the first write data stream associates with one of a plurality of patterns. If the first write data stream does not associate with any one of the plurality of patterns, the memory controller sets identification information corresponding to the first logical access address as a default value, programs the first write data stream into a first physical access address in the data bit area of the first physical programming unit and programs the identification information corresponding to the first logical access address into the redundancy bit area of the first physical programming unit. If the first write data stream associates with one of the plurality of patterns, the memory controller sets the identification information corresponding to the first logical access address as an identification value corresponding to the pattern and programs the identification information corresponding to the first logical access address into the redundancy bit area of the first physical programming unit, wherein the first write data stream is not programmed into the first physical programming unit. In addition, the memory controller is configured to map the first logical programming unit to the first physical programming unit.

An exemplary embodiment of the present invention provides a data processing method for a re-writable non-volatile memory module having a plurality of physical programming units. Each of the physical programming units includes a data bit area and a redundancy bit area, and the data bit area includes a plurality of physical access addresses. A plurality of logical programming units is configured for mapping to at least a portion of the physical programming units, and each the logical programming units has a plurality of logical access addresses. The data processing method includes receiving a read command from a host system, wherein the read command indicates reading data stored in a first logical access address. The data processing method further includes reading identification information corresponding to the first logical access address from a predetermined area and determining whether the identification information is an identification value. The data processing method also includes transmitting a predetermined data to the host system if the read identification information is the identification value. The data processing method yet includes transmitting a data stream read from a physical access address mapping to the first logical access address to the host system if the identification information is not the identification value. Herein, the number of bits of the identification value is smaller than the number of bits of the predetermined data.

Based on the above, in the data processing method, the memory controller and the memory storage device of the exemplary embodiments of the present invention, the corresponding identification information is recorded in the predetermined area, such that meaningless writing operations can be avoided and the speed to write data can be enhanced. In addition, in the data processing method, the memory controller and the memory storage device of another exemplary embodiments of the present invention, the corresponding specific data can rapidly transmitted to the host by identifying the identification information in the predetermined area, such that the speed to read data can be increased.

It should be understood, however, that this Summary may not contain all of the aspects and embodiments of the present invention, is not meant to be limiting or restrictive in any manner, and that the present invention as disclosed herein is and will be understood by those of ordinary skill in the art to encompass obvious improvements and modifications thereto.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

Figure 1A:
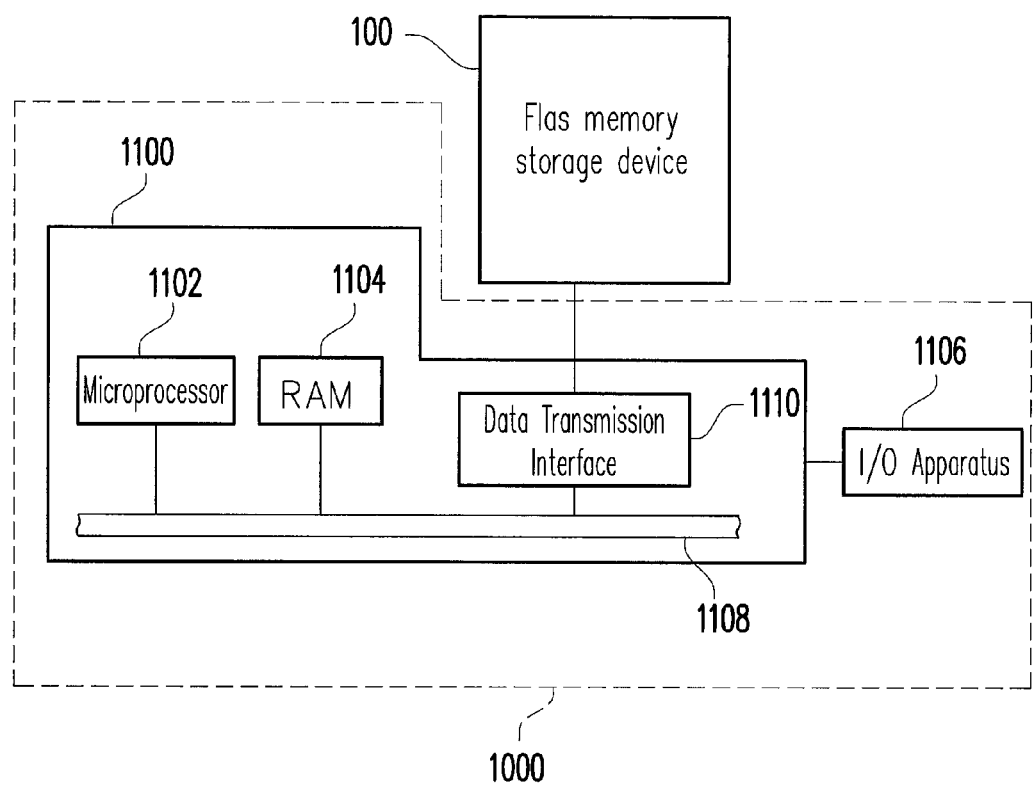
FIG. 1A is a diagram illustrating a host system and a memory storage device according to an exemplary embodiment of the present invention.

Reference will now be made in detail to the present preferred embodiments of the present invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (which is also referred to as a memory storage system) includes a rewritable non-volatile memory module and a controller (which is also referred to as a control circuit). The memory storage device is typically used together with a host system to facilitate the host system writing data into the memory storage device or reading data from the memory storage device.

FIG. 1A is a diagram illustrating a host system and a memory storage device according to an exemplary embodiment of the present invention.

Figure 1B:
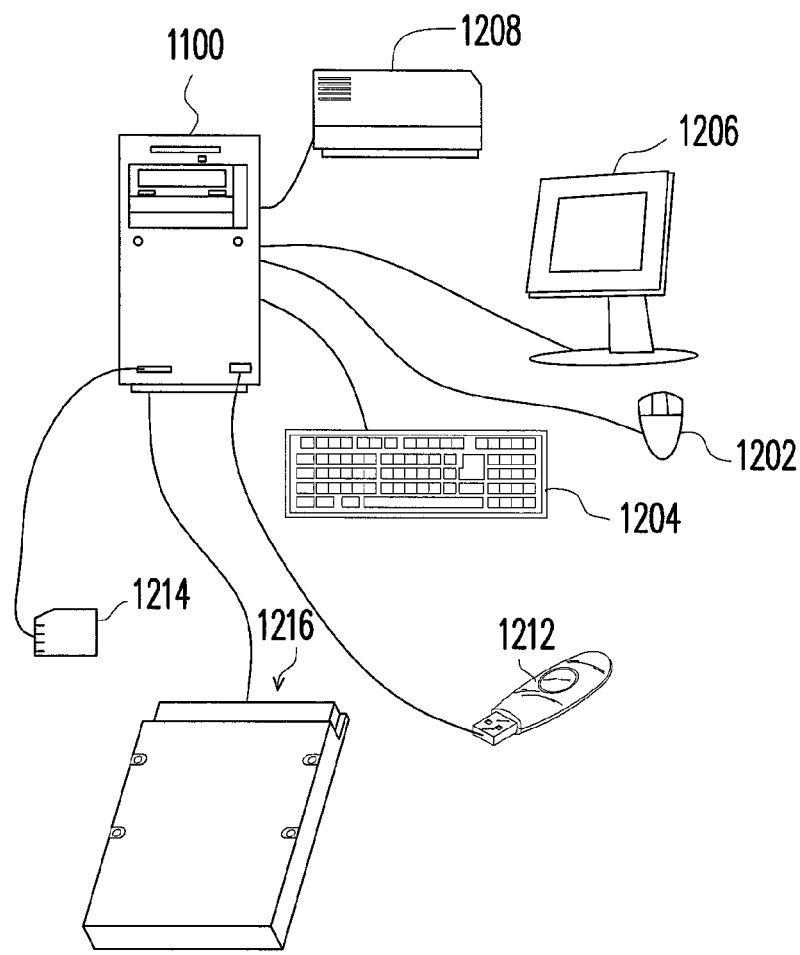
FIG. 1B is a schematic diagram of a computer, an input/output device and a memory storage device according to an exemplary embodiment of the present invention.

Referring to FIG. 1A, the host system 1000 generally includes a computer 1100 and an input/output (I/O) device 1106. The computer 1100 includes a microprocessor 1102, a random access memory (RAM) 1104, a system bus 1108 and a data transmission interface 1103. The I/O device 1106 includes a mouse 1202, a keyboard 1204, a display 1206 and a printer 1252 shown in FIG. 1B. It should be noticed that the devices shown in FIG. 1B are not used to limit the I/O device 1106, and the I/O device 1106 may also include other devices.

In the present embodiment, the memory storage device 100 is coupled to the other devices of the host system 1000 through the data transmission interface 1110. Based on operations of the microprocessor 1102, the RAM 1104, and the I/O device 1106, data can be written into the memory storage device 100 or read from the memory storage device 100. For example, the memory storage device 100 can be a rewritable non-volatile memory storage device such as a flash drive 1256, a memory card 1214 or a solid state drive (SSD) 1216 shown in FIG. 1B.

Figure 1C:
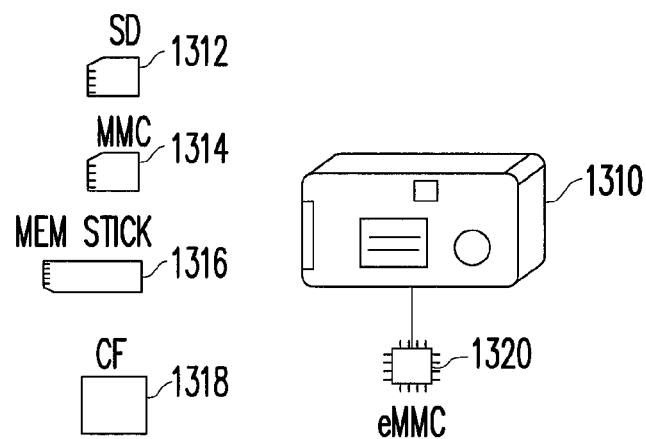
FIG. 1C is a schematic diagram of a host system and a memory storage device according to an exemplary embodiment of the present invention.

Generally, the host system 1000 can be any system substantially used together with the memory storage device 100 for storing data. In the present exemplary embodiment, the host system 1000 implemented by a computer system is taken as an example. However, in another exemplary embodiment of the present invention, the host system 1000 can also be a digital camera, a video camera, a communication device, an audio player or a video player, etc. For example, when the host system is a digital camera (video camera) 1310, the rewritable non-volatile memory storage device is a secure digital (SD) card 1312, a multimedia card (MMC) 1314, a memory stick (MS) card 1316, a compact flash (CF) card 1318 or an embedded storage device 1320 (shown in FIG. 1C) used therein. The embedded storage device 1320 includes an embedded MMC (eMMC). It should be noticed that the eMMC is directly coupled to a substrate of the host system.

Figure 2:
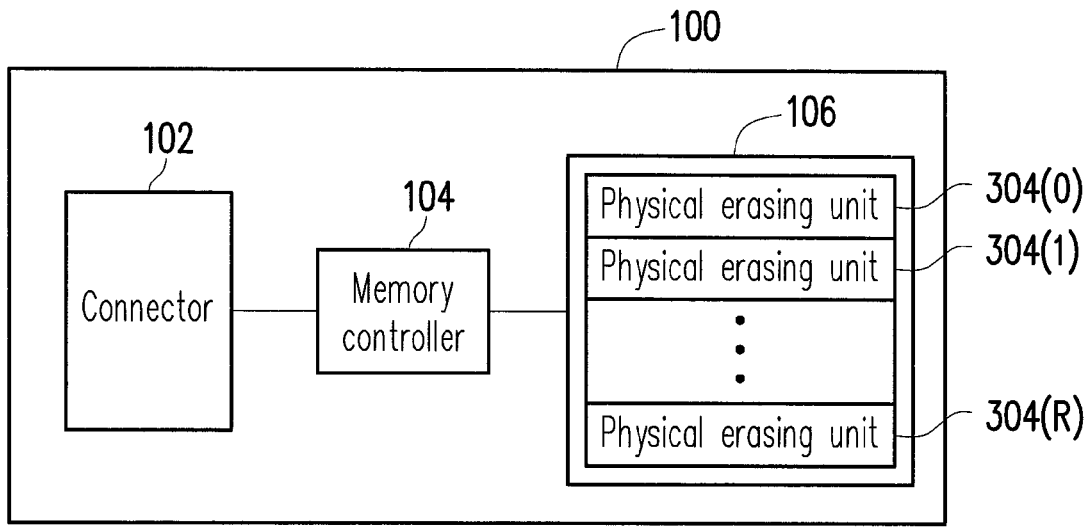
FIG. 2 is a schematic block diagram illustrating the memory storage device as depicted in FIG. 1A.

FIG. 2 is a schematic block diagram illustrating the memory storage device as depicted in FIG. 1A.

Referring to FIG. 2, the memory storage device 100 includes a connector 102, a memory controller 104 and a rewritable non-volatile memory module 106.

In the present exemplary embodiment, the connector 102 is complied with the serial advanced technology attachment (SATA) standard. However, it should be noticed that the present invention is not limited thereto, and the connector 102 may also be complied with a parallel advanced technology attachment (PATA) standard, the institute of electrical and electronic engineers (IEEE) 1394 standard, the peripheral component interconnect express (PCI express) standard, the universal serial buss (USB) standard, the secure digital (SD) interface standard, the memory stick (MS) interface standard, the multi media card (MMC) interface standard, the compact flash (CF) interface standard, the integrated drive electronics (IDE) interface standard or other suitable standards.

The memory controller 104 is configured to execute a plurality of logic gates or control instructions implemented in a hardware form or a firmware form, and to perform a writing operation, a reading operation or an erasing operation on the rewritable non-volatile memory module 106 according to commands of the host system 1000.

The rewritable non-volatile memory module 106 is coupled to the memory controller 104 for storing data written by the host system 1000. The rewritable non-volatile memory module 106 has physical erasing units 304(0)-304(R). For example, the physical erasing units 304(0)-304(R) may associate with a same memory die or associate with different memory dies. Each of the physical erasing units has a plurality of physical programming units, and each physical programming unit associating to the same physical erasing unit may be individually written and simultaneously erased. For example, each physical erasing unit is composed of 128 physical programming units. However, it should be noticed that the present invention is not limited thereto, and each physical erasing unit can be composed of 64 physical programming units, 256 physical programming units or any other number of the physical programming units.

In details, a physical erasing unit is the minimum erasing unit. Namely, each physical erasing unit contains the least number of memory cells that are erased together. And, a physical programming unit is the minimum programming unit. Namely, a physical programming unit is the minimum unit for writing data. Each physical programming unit generally includes a data bit area and a redundancy but area. The data bit area includes a plurality of physical access addresses and is used for storing user data, and the redundancy bit area is used for storing system data (e.g. control information and an checking and correcting code). In the present exemplary embodiment of the present invention, two physical access addresses are contained in a data bit area of each physical programming unit, and the size of a physical access address is 512 kilobyte (KB). However, in other exemplary embodiments, a number of more or fewer physical access addresses may be contained in the data bit area, and the present invention is not intent to limit the size and number of the physical access addresses. For example, a physical erasing unit may be a physical block, and a physical programming unit may be a physical page.

In the present exemplary embodiment, the rewritable non-volatile memory module 106 is a multi level cell (MLC) NAND flash memory module, wherein data of 2 bits may be stored in one memory cell. However, the present invention is not limited thereto, and the rewritable non-volatile memory module 106 may also be a single level cell (SLC) NAND flash memory module, a trinary level cell (TLC) NAND flash memory module or other flash memory modules or other memory modules having the same characteristic.

Figure 3:
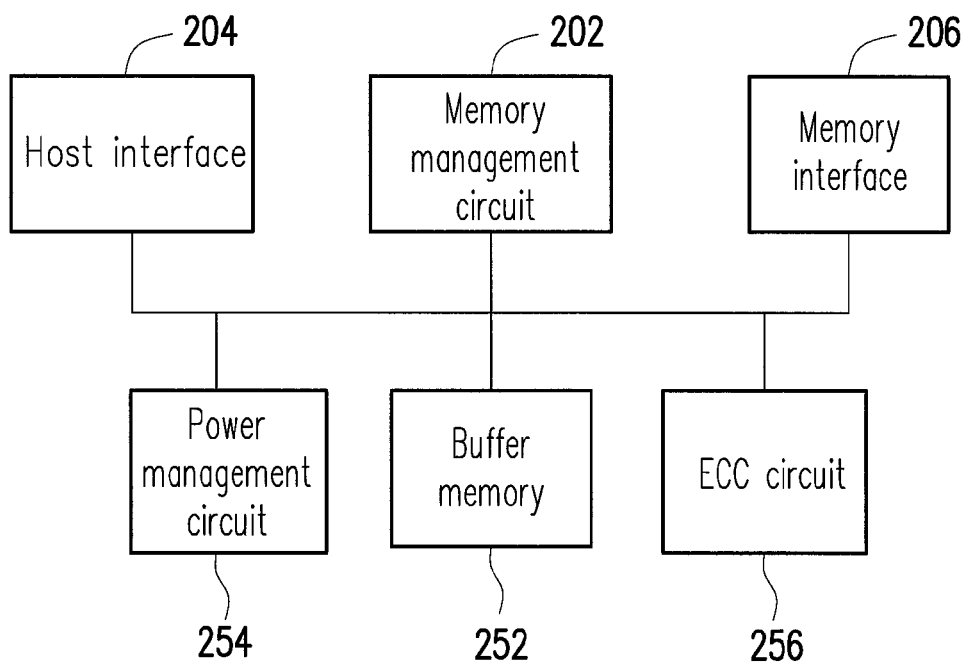
FIG. 3 is a schematic block diagram illustrating a memory controller according to an exemplary embodiment of the present invention.

FIG. 3 is a schematic block diagram illustrating a memory controller according to an exemplary embodiment of the present invention.

Referring to FIG. 3, the memory controller 104 includes a memory management circuit 202, a host interface 204 and a memory interface 206.

The memory management circuit 202 is configured for controlling a whole operation of the memory controller 104. Specifically, the memory management circuit 202 has a plurality of control instructions, and when the memory storage device 100 is operated, these control instructions are executed perform an operation, such as data writing, data reading and data erasing.

In the present exemplary embodiment, the control instructions of the memory management circuit 202 are implemented in a firmware form. For example, the memory management circuit 202 has a micro processing unit (not shown) and a read-only memory (ROM, not shown), and these control commands are burning recorded in the read-only memory. When the memory storage device 100 is operated, the control commands are executed by the microprocessor unit to perform the operation, such as data writing, data reading and data erasing.

In another exemplary embodiment of the present invention, the control instructions of the memory management circuit 202 may also be stored in a specific area (for example, a system area in a memory module dedicated to storing system data) of the rewritable non-volatile memory module 106 in a form of program codes. In addition, the memory management circuit 202 includes a microprocessor unit (not shown), a read-only memory (ROM, not shown) and a random access memory (RAM, not shown). Specially, the ROM has boot codes, and when the memory controller 104 is enabled, the microprocessor unit first executes the boot codes to load the control instructions stored in the rewritable non-volatile memory module 106 to the RAM of the memory management circuit 202. Then, the microprocessor unit executes the control instructions to perform the operation, such as data writing, data reading, and data erasing.

Further, in another exemplary embodiment of the present invention, the control commands of the memory management circuit 202 may also be implemented in a hardware form. For instance, the memory management circuit 202 includes a micro controller, a memory cell management circuit, a memory writing circuit, a memory reading circuit, a memory erasing circuit and a data processing circuit. These circuits are coupled to the micro controller. Here, the memory cell management circuit is configured for managing the physical erasing units of the rewritable non-volatile memory module 106. The memory writing circuit is configured for giving a write command to the rewritable non-volatile memory module 106 to write data thereto. The memory reading circuit is configured for giving a read command to the rewritable non-volatile memory module 106 to read data therefrom. The memory erasing circuit is configured for giving an erase command to the rewritable non-volatile memory module 106 to erase data therefrom. And, the data processing circuit is configured for processing data to be written to the rewritable non-volatile memory module 106 or data read from the rewritable non-volatile memory module 106.

The host interface 204 is coupled to the memory management circuit 202 and configured for receiving and identifying commands and data transmitted from the host system 1000. Namely, the commands and data transmitted from the host system 1000 are transmitted to the memory management circuit 202 through the host interface 204. In the present exemplary embodiment, the host interface 204 complies with the SATA standard. However, it is should be noted that the present invention is not limited thereto, and the host interface 204 can also comply with the PATA standard, the IEEE 1394 standard, the PCI Express standard, the USB standard, the SD standard, the MS standard, the MMC standard, the CF standard, the IDE standard, or any other appropriate data transmission standard.

The memory interface 206 is coupled to the memory management circuit 202 and configured for accessing the rewritable non-volatile memory module 106. In other words, data to be written to the rewritable non-volatile memory module 106 is converted to an acceptable format for the rewritable non-volatile memory module 106 by the memory interface 206.

In an exemplary embodiment of the present invention, the memory controller 104 further includes a buffer memory 252, a power management circuit 254 and an error checking and correcting circuit 256.

The buffer memory 252 is coupled to the memory management circuit 202 and configured for temporarily storing the data and commands from the host system 1000 or the data from the rewritable non-volatile memory module 106.

The power management circuit 254 is coupled to the memory management circuit 202 and configured for controlling the power of the memory storage device 100.

The error checking and correcting circuit 256 is coupled to the memory management circuit 202 and configured for performing an error checking and correcting procedure to ensure the accuracy of data. In particular, when the memory managing 202 receives a write command from the host system 1000, the error checking and correcting circuit 256 generates an error checking and correcting code (ECC code) corresponding to data of the write command, and the memory management circuit 202 writes data corresponding to the write command and the corresponding ECC code to the rewritable non-volatile memory module 106. Afterwards, when reading data from the rewritable non-volatile memory module 106, the memory management circuit 202 also reads the corresponding ECC code, and the error checking and correcting circuit 256 executes an error checking and correcting procedure on the read data according to the ECC code.

Figure 4:
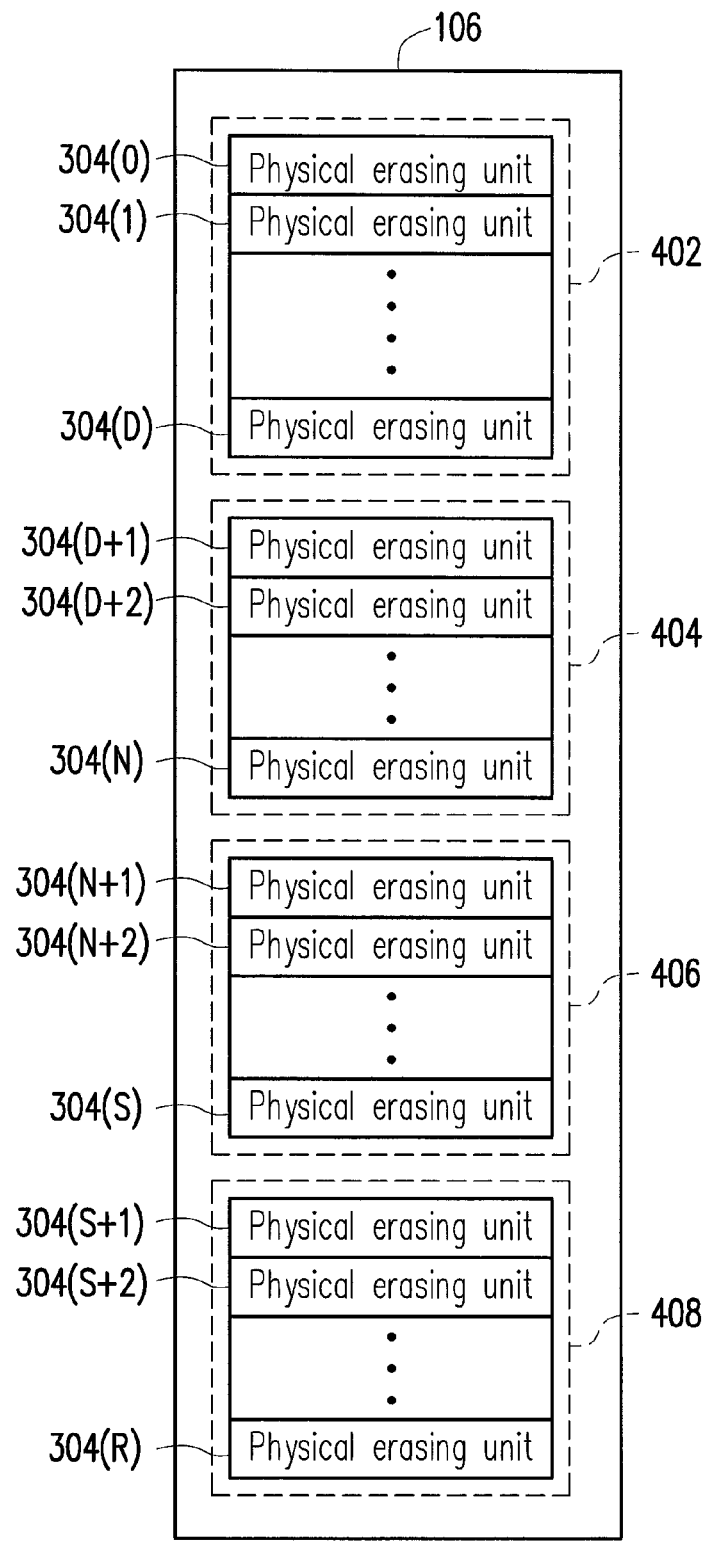
FIG. 4 and FIG. 5 are schematic diagrams illustrating examples of managing a rewritable non-volatile memory module according to an exemplary embodiment of the present invention.
Figure 5:
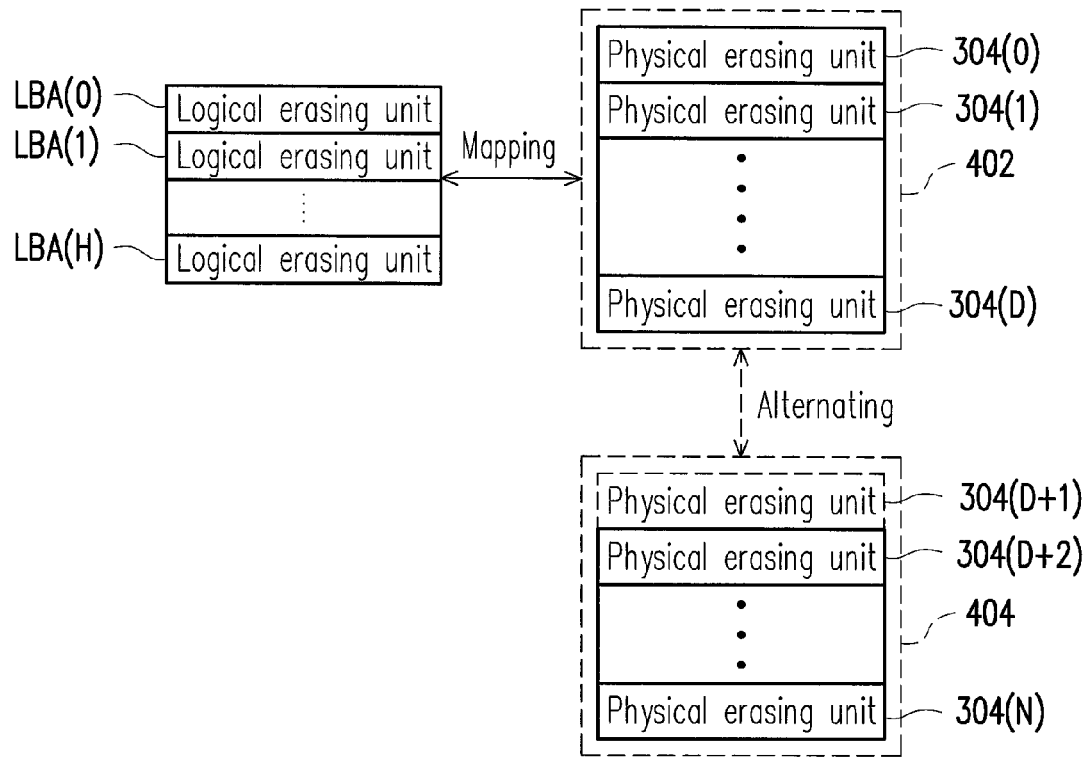

FIG. 4 and FIG. 5 are schematic diagrams illustrating examples of managing a rewritable non-volatile memory module according to an exemplary embodiment of the present invention.

It should be understood that the terms used herein for describing the operations (for example, "get", "exchange", "group", and "alternate", etc) performed on the physical erasing units of the memory module 106 refer to logical operations performed on these physical erasing units. Namely, the actual positions of the physical erasing units in the rewritable memory module are not changed, and the physical blocks in the rewritable memory module are only logically operated.

Referring to FIG. 4, the memory controller 104 logically groups the physical blocks 304(0)-304(R) of the rewritable non-volatile memory module 106 to a data area 402, a spare area 404, a system area 406 and a replacement area 408.

The physical erasing units of the data area 402 and the spare area 404 are used for storing data from the host system 1000. In particular, the data area 402 are the physical erasing units for the stored data, and the physical erasing units of the spare area 404 are physical blocks for replacing the physical erasing units in data area 402. Hence, the physical erasing units of the spare area 404 are either blank or available. Namely, no data is recorded therein or data recorded therein is marked as invalid data not in use. That is, an erasing operation has been performed on the physical erasing units of the spare area 404, or before a physical erasing unit of the spare area 404 is gotten for storing data, the erasing operation is performed on the gotten physical block.

The physical erasing units logically associating to the system area 406 are used for recording system data. The system data includes information related to the manufacturer and a model of the memory module, the number of the physical erasing units of a memory chip and the number of the physical programming units in each physical erasing unit and so forth.

The physical erasing units logically associating to the replacement area 408 are replacement physical erasing units. For example, when the rewritable non-volatile memory module 106 is manufactured in the factory, 4% of the physical erasing units thereof are reserved for replacement. Namely, when any physical erasing unit in the data area 402, the spare area 404, and the system area 406 is damaged, a physical erasing unit reserved in the replacement area 408 is used for replacing the damaged physical erasing unit, i.e. the bad unit. Thus, if there are still normal physical erasing units in the replacement area 408, and a physical erasing unit is damaged, the memory controller 104 gets a normal physical erasing unit from the replacement area 408 for replacing the damaged physical erasing unit. If there are no more normal physical erasing units in the replacement area 408, and a physical erasing unit is damaged, the memory controller 104 declares that the whole memory storage device 100 is in a write-protect status, and a first write data stream is allowed to be written therein.

In particular, the numbers of physical erasing units in the data area 402, the spare area 404, the system area 406 and the replacement area 408 are various based on different memory modes. Additionally, it should be understood that the grouping relationships of grouping the physical erasing units to data area 402, the spare area 404, the system area 406 and the replacement area 408 are dynamically changed during the operation of the memory storage device 100. For example, when a physical erasing unit in the spare area 404 is damaged and replaced by a physical erasing unit of the replacement area, the physical erasing unit initially located at the replacement area is associated with the spare area.

Referring to FIG. 5, as described above, the physical erasing units in the data area 402 and the spare area 404 are alternated to store data written by the host system 1000. In the present exemplary embodiment, the memory controller 104 configures logical blocks LBA(0)-LBA(N) for mapping to the physical erasing units in the data area 40. Each physical erasing unit has a plurality of logical programming units, which are sequentially mapped to the corresponding physical programming units of the physical erasing units. For example, the memory controller 104 (or, the memory management circuit 202) maintains a logical erasing unit-physical erasing unit table for recording the mapping relationship between the logical erasing units LBA(0)-LBA(H) and the physical erasing units in the data area 402.

Figure 6:
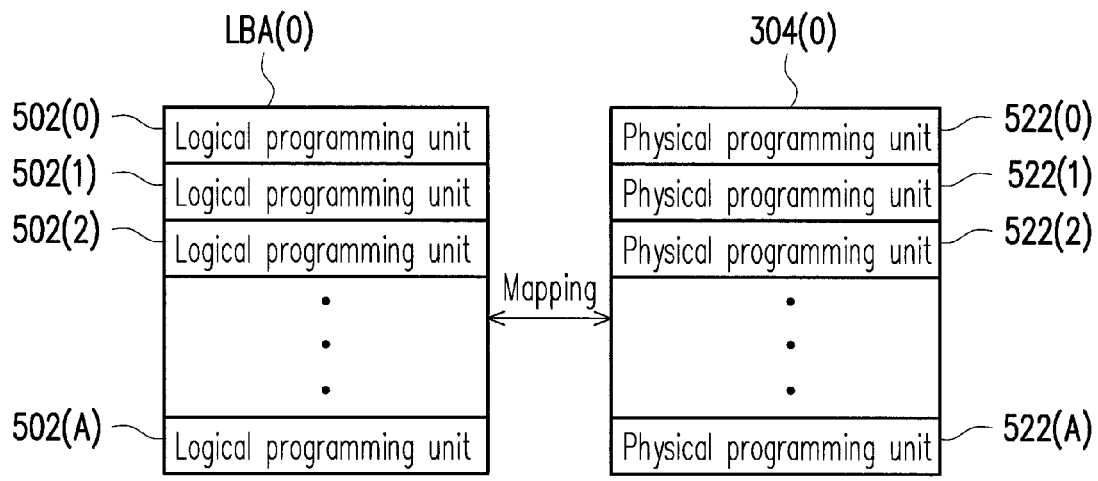
FIG. 6 is a mapping schematic diagram of mapping logical erasing units to physical erasing units according to an exemplary embodiment of the present invention.

FIG. 6 is a mapping schematic diagram of mapping logical erasing units to physical erasing units according to an exemplary embodiment of the present invention.

Referring to FIG. 6, a logical erasing unit includes a plurality of logical programming units, and the logical programming units are mapped to the physical programming units of each physical erasing unit in the data area 402. For example, the logical programming units 502(0)-502(A) of the logical erasing unit LBA(0) are mapped to physical programming units 522(0)-522(A) of the erasing unit 304(0).

In addition, the host system 1000 accesses data by using a logical access address (e.g. a sector) as a unit. Thus, when the host system 1000 accesses data, the memory management circuit 202 converts the logical access addresses corresponding to the memory storage device 100 as the corresponding logical programming units. For example, when the host system 100 is to access one logical access address, the memory management circuit 202 converts the logical access address accessed by the host system 1000 as a multi-dimensional address constructed of the logical erasing unit and the logical programming unit corresponding thereto, and accesses data in the mapped physical programming unit through the logical erasing unit-physical erasing unit mapping table.

Figure 7:
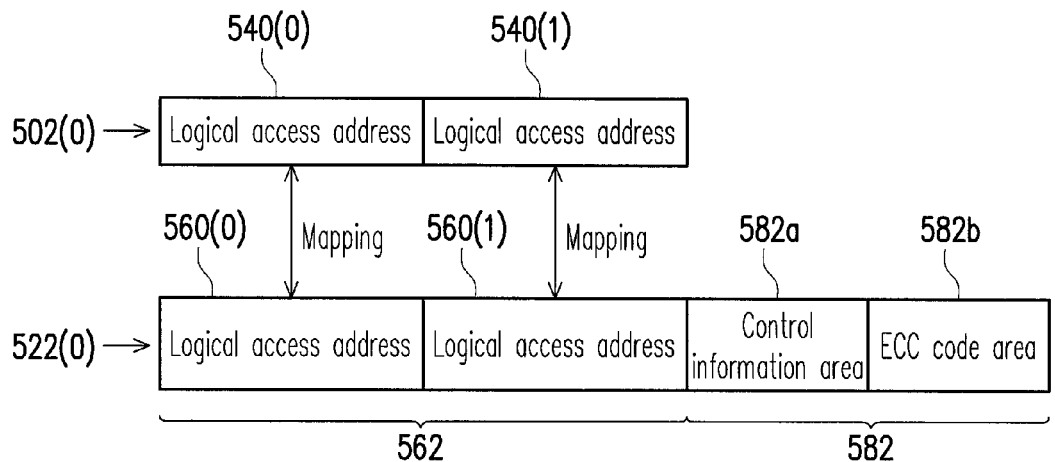
FIG. 7 is a mapping schematic diagram of logical programming units and physical programming units according to the first exemplary embodiment of the present invention.

FIG. 7 is a mapping schematic diagram of logical programming units and physical programming units according to the first exemplary embodiment of the present invention. The manner for mapping each physical programming unit and that for each logical programming unit are similar. Hereinafter, a description will be made by using the physical programming unit 522(0) and the logical programming unit 502(0) as an example, and the mapping of other physical programming units and logical programming units may do likewise.

Referring to FIG. 7, the physical programming unit 522(0) includes a data bit area 562 and a redundancy bit area 582. The data bit area 562 includes physical access addresses 560(0) and 560(1). The logical programming unit includes logical access addresses 540(0) and 540(1), which are respectively mapped to the physical access addresses 560(0) and 560(1) of the physical programming unit 522(0).

The redundancy bit area 582 includes a control information area 582a and an ECC code area 582b. The control information area 582 is configured for storing control information regarding the physical programming unit, for example, the information about which logical programming unit the physical programming unit is mapped to. The ECC code area 582b is configured for storing the ECC code corresponding to the data to be stored to the physical programming unit 522(0). When the memory controller 104 (or the memory management circuit 202) is to write (or to program) the data associating to the logical access addresses 540(0) and 540(1) to the physical access addresses 560(0) and 560(1), the corresponding control information and the ECC code are written altogether to the control information area 582a and the ECC code area 582b. That is, the memory controller 104 (or the memory management circuit 202) gives a programming command to the rewritable non-volatile memory module 106 to write the data associating to the logical access addresses 540(0) and 540(1), the corresponding control information and the corresponding ECC code to the physical programming unit 522(0) altogether.

In the present exemplary embodiment, the memory management circuit 202 processes data using a normal write procedure or a special write procedure according to a pattern of the data to be stored. In particular, when data (which is also referred to as a write data stream) associating to the logical access address is to be written to one physical programming unit, the memory management circuit 202 determines whether the write data stream associates with the specific pattern. Meanwhile, when the write data stream associates with such specific pattern, the memory management circuit 202 processes the write data stream using the special write procedure. And, when the write data stream does not associate with such specific pattern, the memory management circuit 202 programs the write data stream using the normal write procedure. In addition, when writing data associating to one logical programming unit into one physical programming unit, the memory controller 104 (or the memory management circuit 202) writes identification information corresponding to the logical access address of the logical programming unit to a predetermined area altogether. For example, the memory controller 104 (or the memory management circuit 202) writes the identification information to the redundancy bit area of the physical programming unit. Then, the memory controller 104 (or the memory management circuit 202) identifies whether the physical programming unit is programmed by the normal write procedure or the special write procedure based on the identification information. For instance, as shown in FIG. 7, when writing the data associating to the logical access addresses 540(0) and 540(1) to the physical access addresses 560(0) and 560(1), the identification information corresponding to the logical access addresses 540(0) and 540(1) is written to the control information area 582a in the redundancy bit area 582 altogether. It should be known that even though in the present exemplary embodiment, the identification information is stored by using the redundancy bit area of the physical programming unit as the predetermined area, but the present invention is not limited thereto. For example, an additional storing unit may be configured in the memory storage device 100 for storing the identification information, or alternatively, the identification information may be stored in a mapping table.

In the present exemplary embodiment, when the data stored in the logical access address does not associate with the specific pattern, the identification information corresponding to the logical access address is set as a default value. Otherwise, when the data stored in the logical access address associates with the specific pattern, the identification information corresponding to logical access address is set as an identification value corresponding to the specific pattern. Here, the number of bits of the identification value of the identification information is set to be smaller than a number of bits of predetermined data associating to the specific pattern. For example, in the present exemplary embodiment, when each data bit of the data stored in the logical access address is "0", the data is identified as associating to the specific pattern, and the identification information corresponding to the logical access address is set as "1". Otherwise, when one of the data bit of the data is not "0", the data is as not associating to the specific pattern, and the identification information corresponding to the logical access address is set as "0".

It should be understood that identifying the data having each data bit of "0" as associating to the specific pattern is only an example falling within the scope of the present invention, and the present invention is not limited thereto. For example, in another exemplary embodiment of the present invention, the data having each data bit of "0xFF" may also be identified as associating to the specific pattern.

Specially, in the present exemplary embodiment, when data to be written to one logical access address associates with the specific pattern, the memory controller 104 (or the memory management circuit 202) writes the identification information corresponding to the logical access address to the redundancy bit area of the physical programming unit rather than writing the data associating to the logical access address to the physical access address in the data bit area of the physical programming unit.

Figure 8:
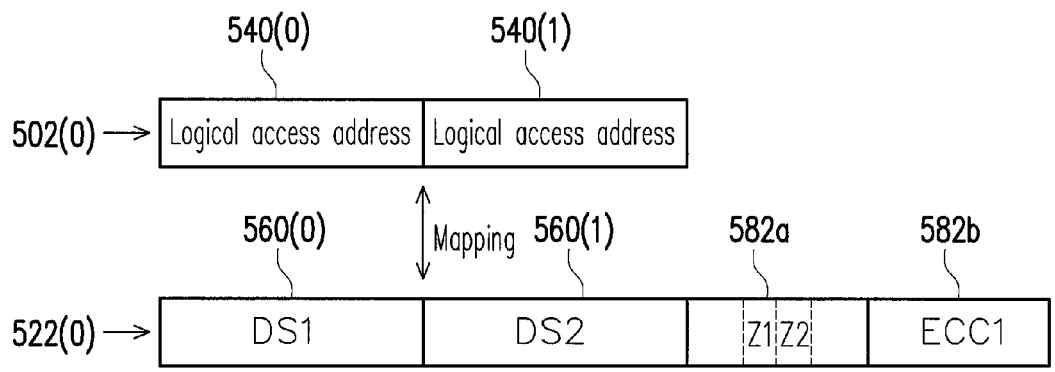
FIG. 8 illustrates an example of programming data to physical programming units using a normal write procedure according to an embodiment of the present invention.

FIG. 8 illustrates an example of programming data to physical programming units using a normal write procedure according to an embodiment of the present invention.

Referring to FIG. 8, it is assumed that the memory controller 104 (or the memory management circuit 202) receives a write command from the host system 1000 instructing to write a write data stream (hereinafter as a first write data stream DS1) to the logical access address 540(0) of the logical programming unit 502(0) and to write another write data stream (hereinafter as a second write data stream DS2) to the logical access address 540(1) of the logical programming unit 502(0). Both the first write data stream DS1 and the second write data stream DS2 do not associate with the aforementioned specific pattern.

When receiving the write command, the first write data stream DS1 and the second write data stream DS2, the memory controller 104 (or the memory management circuit 202) determines that the first write data stream DS1 does not associate with the specific pattern and sets identification information Z1 corresponding to the logical access address 540(0) as a default value. Further, the memory controller 104 (or the memory management circuit 202) determines that the second write data stream DS2 does not associate with the specific pattern, sets identification information Z2 corresponding to the logical access address 540(1) as the default value.

Then, the memory controller 104 selects a blank physical programming unit (e.g. physical programming unit 522(0)) and gives a programming command to the rewritable non-volatile memory module 106 to write the first write data stream DS1 and the second write data stream DS2 to the physical programming unit 522(0). For example, the error checking and correcting circuit 256 generates an ECC code ECC1 according to the first write data stream DS1 and the second write data stream DS2. Meanwhile, the memory management circuit 202 gives the programming command to write the first write data stream DS1 to the physical access address 560(0) and to write the second write data stream DS2 to the physical access address 560(1). The memory management circuit 202 further writes the identification information Z1 and Z2 corresponding to the logical access addresses 540(0) and 540(1) to the control information area 582a of the redundancy bit area 582 and writes the ECC code to the ECC code area 582b of the redundancy bit area 582.

At last, the memory controller 104 (or the memory management circuit 202) maps the logical programming unit 502(0) to the physical programming unit 522(0).

In the example illustrated in FIG. 8, when the host system 1000 gives the read command to read the data stored in the logical access address 540(0), the memory controller 104 (or the memory management circuit 202) reads data from the physical programming unit 522(0), identifies that the data in the physical access address 560(0) is written by the normal write procedure according to the identification information Z1 corresponding to the logical access address 540(0), and transmits the data (which is also referred to as a read data stream, i.e. the data stream DS1) read from the physical access address 560(0) to the host system 1000. It is to be noted that when reading data from the physical programming unit 522(0), the error checking and correcting circuit 256 perform the error checking and correcting operation on the read data according to the ECC code ECC1.

Similarly, when the host system 1000 is to read the data stored in the logical access address 540(1), the memory controller 104 (or the memory management circuit 202) identifies that the data in the physical access address 560(1) is written by using the normal write procedure according to the identification information Z2 corresponding to the logical access address 540(1) and transmits the data (i.e. the data stream DS2) read from the physical access address 560(1) to the host system 1000.

Figure 9:
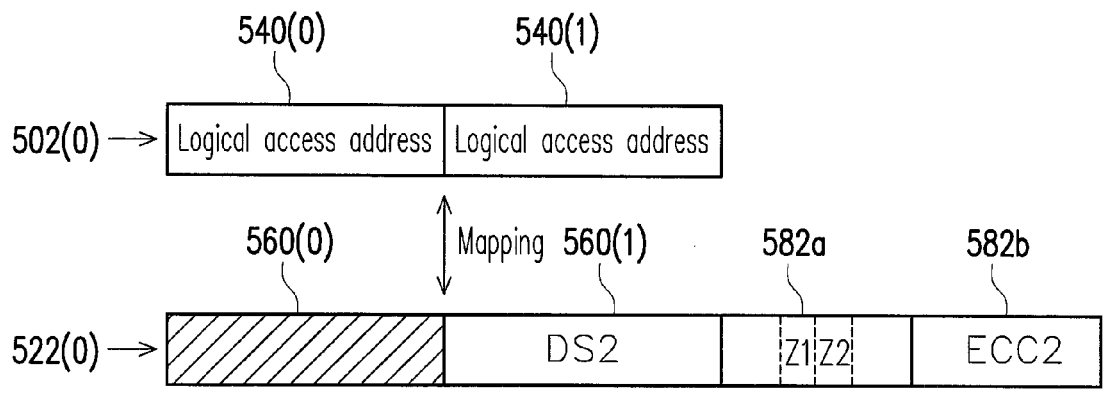
FIG. 9 illustrates an example of programming data to physical programming units using a special write procedure according to an embodiment of the present invention.

FIG. 9 illustrates an example of programming data into physical programming units using a special write procedure according to an embodiment of the present invention.

With reference to FIG. 9, it is assumed that the memory controller 104 (or the memory management circuit 202) receives a write command from the host system 1000 to write the first write data stream DS1 to the logical access address 540(0) of the logical programming unit 502(0) and to write the second write data stream DS2 to logical access address 540(1) of the logical programming unit 502(0). The first write data stream DS1 associates with the aforementioned specific pattern, while the second write data stream DS2 does not associate with the aforementioned specific pattern.

When receiving the write command, the first write data stream DS1 and the second write data stream DS2, the memory controller 104 (or the memory management circuit 202) determines that the first write data stream DS1 associates with the specific pattern and sets the identification information Z1 corresponding to the logical access address 540(0) as an identification value corresponding to the specific pattern. In addition, the memory controller 104 (or the memory management circuit 202) determines that the second write data stream DS2 does not associate with the specific pattern and sets the identification information Z2 corresponding to the logical access address 540(1) as the default value.

Afterward, the memory controller 104 selects a blank physical programming unit (e.g. physical programming unit 522(0)) and gives the programming command the rewritable non-volatile memory module 106 to write the second write data stream DS2 to the physical programming unit 522(0) rather than writing the first write data stream DS1 to the physical programming unit 522(0).

For example, the error checking and correcting circuit 256 generates an ECC code ECC2 according the second write data stream DS2. Otherwise, in another exemplary embodiment, the error checking and correcting circuit 256 generates the ECC code ECC2 according to original bit statuses of the second write data stream DS2 and the physical access address 560(0) (for example, each bit is "0XFF"). Meanwhile, the memory management circuit 202 gives the programming command to write the second write data stream DS2 to the physical access address 560(1), writes the identification information Z1 and Z2 corresponding to the logical access addresses 540(0) and 540(1) to the control information area 582a in the redundancy bit area 582 and writes the ECC code ECC2 to the ECC code area 582b in the redundancy bit area 582. The physical access address 560(0) is not written to the first write data stream DS1.

At last, the memory controller 104 (or the memory management circuit 202) maps the logical programming unit 502(0) to the physical programming unit 522(0).

In the example illustrated in FIG. 9, when the host system 1000 gives the read command to read the data stored in the logical access address 540(0), the memory controller 104 (or the memory management circuit 202) reads data from the physical programming unit 522(0), identifies that the data in the physical access address 560(0) is written by the special write procedure according to the identification information Z1 corresponding to the logical access address 540(0) and directly transmits the predetermined data (e.g. a data stream having all bits of "0") corresponding to the specific pattern to the host system.

If the host system 1000 is to read data stored in the logical access address 540(1), the memory controller 104 (or the memory management circuit 202) identifies that the data in the physical access address 560(1) is written by the normal write procedure according to identification information Z2 corresponding to the logical access address 540(1) and transmits the data read from the physical access address 560(1) (i.e. the data stream DS2) to the host system 1000.

Figure 10:
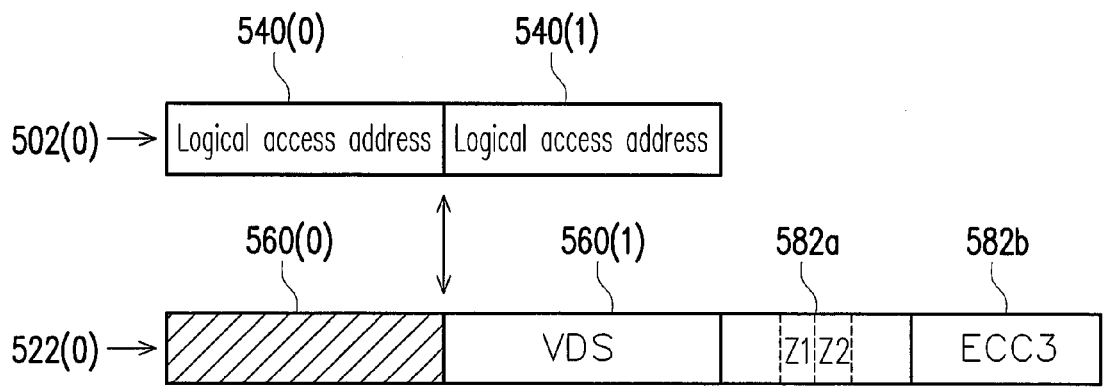
FIG. 10 illustrates another example of programming data to physical programming units using a special write procedure according to an embodiment of the present invention.

FIG. 10 illustrates another example of programming data into physical programming units using a special write procedure according to an embodiment of the present invention.

Referring to FIG. 10, it is assumed that the memory controller 104 (or the memory management circuit 202) receives the write command from the host system 1000 to write the first write data stream DS1 to the logical access address 540(0) of the logical programming unit 502(0), the first write data stream DS1 associates with the specific pattern, and a valid data stream VDS associating to the logical access address 540(1) is stored in another physical programming unit and associates with the specific pattern.

When receiving the write command and the first write data stream DS1 thereof, the memory controller 104 (or the memory management circuit 202) determines that the first write data stream DS1 associates with the specific pattern and sets the identification information Z1 corresponding to the logical access address 540(0) as the identification value corresponding to the specific pattern. Moreover, the memory controller 104 (or the memory management circuit 202) reads the valid data stream VDS associating to the logical access address 540(1) from the physical programming unit storing valid data stream VDS associating to the logical access address 540(1), determines that the valid data stream VDS does not associate with the specific pattern and sets identification information Z2 corresponding to the logical access address 540(1) as the default value.

Then, the memory controller 104 selects a blank physical programming unit (e.g. the physical programming unit 522(0)) and gives the programming command to the rewritable non-volatile memory module 106 to write the valid data stream VDS to the physical programming unit 522(0) rather than writing the first write data stream DS1 to the physical programming unit 522(0). For example, the error checking and correcting circuit 256 generates an ECC code ECC1 according to the valid data stream VDS, gives the programming command to write the valid data stream VDS to the physical access address 560(1), writes the identification information Z1 and Z2 corresponding to the logical access addresses 540(0) and 540(1) to the control information area 582a of the redundancy bit area 582 and writes the ECC code ECC3 to the ECC code area 582b in the redundancy bit area 582. The first write data stream DS1 is not written to physical access address 560(0).

At last, the memory controller 104 (or the memory management circuit 202) maps the logical programming unit 502(0) to the physical programming unit 522(0).

Likewise, the example illustrated in FIG. 10, when the host system 1000 gives the read command to read the data stored in the logical access address 540(0), the memory controller 104 (or the memory management circuit 202) transmits the predetermined data (e.g. a data stream having all bits of "0") corresponding to the specific pattern to the host system. If the host system 1000 is to read data stored in the logical access address 540(1), the memory controller 104 (or the memory management circuit 202) transmits the data read from the physical access address 560(1) (i.e. the data stream VDS) to the host system 1000.

Figure 11:
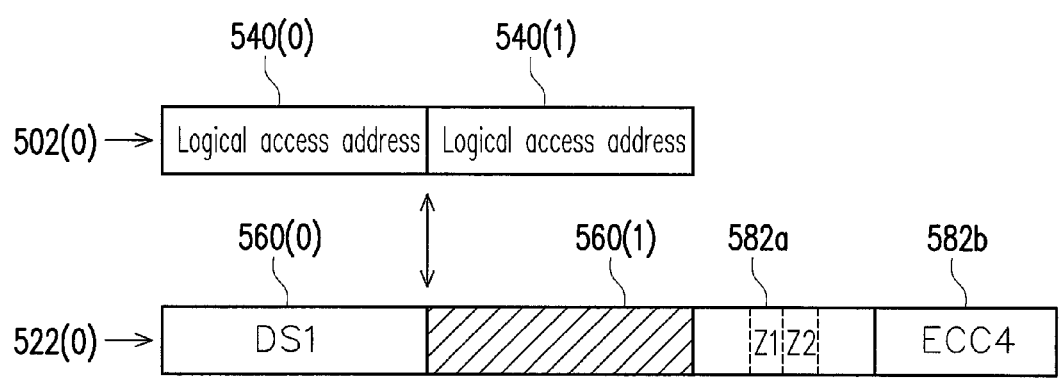
FIG. 11 illustrates still another example of programming data to physical programming units using a special write procedure according to an embodiment of the present invention.

FIG. 11 illustrates still another example of programming data into physical programming units using a special write procedure according to an embodiment of the present invention.

Referring to FIG. 11, it is assumed that the memory controller 104 (or the memory management circuit 202) receives the write command from the host system 1000 to write the first write data stream DS1 to the logical access address 540(0) of the logical programming unit 502(0), the first write data stream DS1 does not associate with the specific pattern, and no data associating to the logical access address 540(1) is stored in the rewritable non-volatile memory module 106.

When receiving the write command and the first write data stream DS1, the memory controller 104 (or the memory management circuit 202) determines that the first write data stream DS1 does not associate with the specific pattern and sets the identification information Z1 corresponding to the logical access address 540(0) as the default value. In addition, since no data associating to the logical access address 540(1) is stored in the rewritable non-volatile memory module 106, the memory controller 104 (or the memory management circuit 202) sets the identification information Z2 corresponding to the logical access address 540(1) as the identification value corresponding to the specific pattern.

Afterward, the memory controller 104 selects a blank physical programming unit (e.g. the physical programming unit 522(0)) and gives the programming command to the rewritable non-volatile memory module 106 to write the first write data stream DS1 to the physical programming unit 522(0). For example, the error checking and correcting circuit 256 generates an ECC code ECC4 according to the first write data stream DS1, writes the identification information Z1 and Z2 corresponding to the logical access addresses 540(0) and 540(1) to the control information area 582a of the redundancy bit area 582 and writes the ECC code ECC4 to the ECC code area 582b in the redundancy bit area 582. The pad value is not written to the physical access address 560(1).

At last, the memory controller 104 (or the memory management circuit 202) maps the logical programming unit 502(0) to the physical programming unit 522(0).

Likewise, the example illustrated in FIG. 11, when the host system 1000 gives the read command to read the data stored in the logical access address 540(0), the memory controller 104 (or the memory management circuit 202) transmits the data read from the physical access address 560(1) (i.e. the data stream DS1) to the host system 1000. If the host system 1000 is to read data stored in the logical access address 540(1), the memory controller 104 (or the memory management circuit 202) transmits the predetermined data (e.g. a data stream having all bits of "0") corresponding to the specific pattern to the host system 1000.

It is to be mentioned that though in the present exemplary embodiment, the memory controller 104 (or the memory management circuit 202) identifies whether data is a general data stream or a data stream associating to a certain specific pattern by determining whether each data bit of the data stream is "0". However, in another exemplary embodiment of the present invention, the memory controller 104 (or the memory management circuit 202) may also identifies the data stream to be written according to various types of patterns and set the identification information corresponding to the logical access address as different identification values. For example, when each data bit of the data stream is "0", the identification information of the data stream corresponding to the logical access address is set as "1". When each data bit of the data stream is "0xFF", the identification information of the data stream corresponding to the logical access address is set as "2". When each data bit of the data stream is "0x55", the identification information of the data stream corresponding to the logical access address is set as "3". And, when each data bit of the data stream is "0xAA" the identification information of the data stream corresponding to the logical access address is set as "4". Accordingly, when the data stream to be stored by the host system 1000 in the logical access address associates with one of multiple patterns, the memory controller 104 (or the memory management circuit 202) sets the identification information corresponding to the logical access address as the corresponding identification value and writes the identification value to the corresponding redundancy bit area of the physical programming unit, without actually writing the data stream to the physical access address. Thereby, the time for executing the write command is shortened. In addition, when performing the read command to one logical access address, the memory controller 104 (or the memory management circuit 202) transmits the predetermined data associating to the corresponding pattern to the host system 1000 if the identification information corresponding to the logical access address is one of the identification values. Thus, the time for executing the read command is shortened.

Figure 12A:
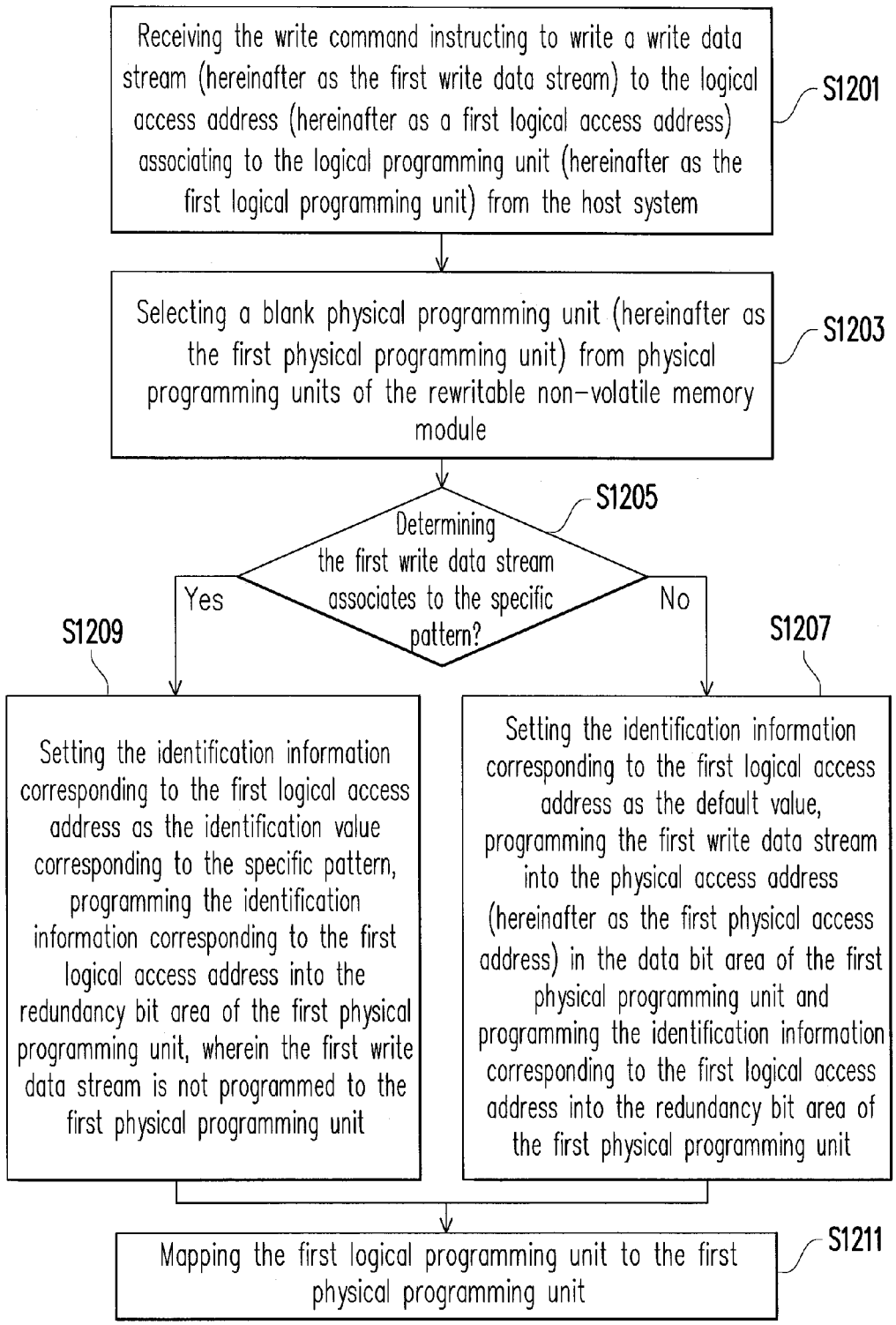
FIGS. 12A and 12B are flowcharts illustrating a data processing method according to an exemplary embodiment of the present invention.
Figure 12B:
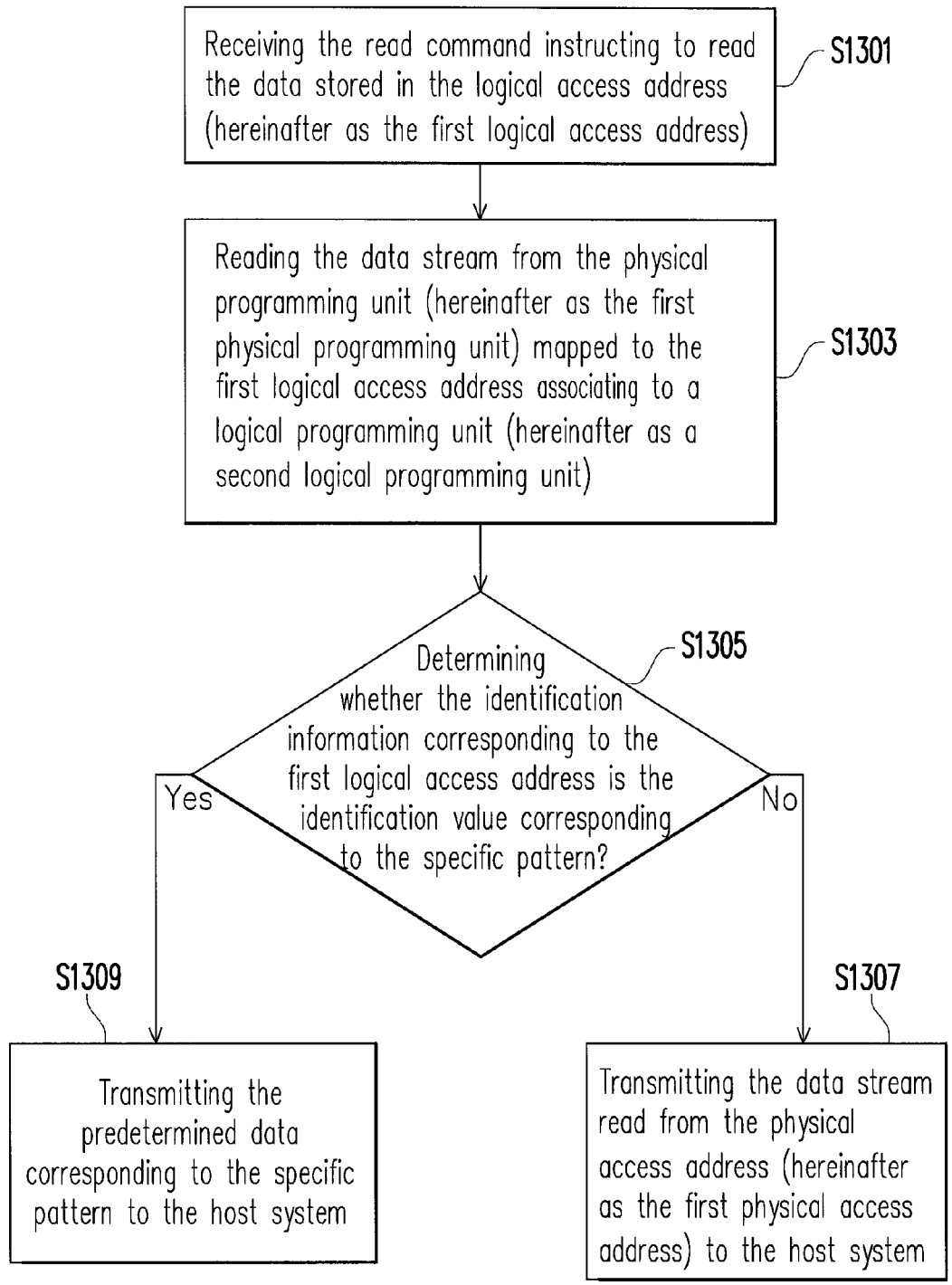

FIGS. 12A and 12B are flowcharts illustrating a data processing method according to an exemplary embodiment of the present invention. FIG. 12A illustrates data processing steps for performing a write command, and FIG. 12B illustrates data processing steps for performing a read command.

Referring to FIG. 12A, in step S1201, the memory controller 104 (or the memory management circuit 202) receives the write command from the host system 1000 instructing to write a write data stream (hereinafter as the first write data stream) to the logical access address (hereinafter as the first logical access address) associating to a logical programming unit (hereinafter as a first logical programming unit).

Then, in step S1203, the memory controller 104 (or the memory management circuit 202) selects a blank physical programming unit (hereinafter as the first physical programming unit) from physical programming units of the rewritable non-volatile memory module 106. Further, in step S1205, the memory controller 104 (or the memory management circuit 202) determines the first write data stream associates with the aforementioned specific pattern.

If the first write data stream does not associate with the specific pattern, in step S1207, the memory controller 104 (or the memory management circuit 202) sets the identification information corresponding to the first logical access address as the default value, programs the first write data stream into the physical access address (hereinafter as the first physical access address) in the data bit area of the first physical programming unit and programs the identification information corresponding to the first logical access address into the redundancy bit area of the first physical programming unit.

If the first write data stream associates with the specific pattern, in step S1209, the memory controller 104 (or the memory management circuit 202) sets the identification information corresponding to the first logical access address as the identification value corresponding to the specific pattern, programs the identification information corresponding to the first logical access address into the redundancy bit area of the first physical programming unit. The first write data stream is not programmed into the first physical programming unit.

Afterward, in step S1211, the memory controller 104 (or the memory management circuit 202) maps the first logical programming unit to the first physical programming unit.

Referring to FIG. 12B, in step S1301, the memory controller 104 (or the memory management circuit 202) receives the read command from the host system 1000 instructing to read the data stored in the logical access address (hereinafter as the first logical access address).

In step S1303, the memory controller 104 (or the memory management circuit 202) reads according to the mapping table the data stream from the physical programming unit (hereinafter as the first physical programming unit) mapped to the first logical access address associating to a logical programming unit (hereinafter as a second logical programming unit).

Afterward, in step 1305, the memory controller 104 (or the memory management circuit 202) determines whether the identification information corresponding to the first logical access address is the identification value corresponding to the specific pattern.

If the identification information corresponding to logical access address is not the identification value corresponding to the specific pattern, in step S1307, the memory controller 104 (or the memory management circuit 202) transmits the data stream read from the physical access address (hereinafter as the first physical access address) to the host system 1000.

If the identification information corresponding to logical access address is the identification value corresponding to the specific pattern, in step S1309, the memory controller 104 (or the memory management circuit 202) transmits the predetermined data corresponding to the specific pattern to the host system 1000.

Based on the above, with the memory storage device, the memory controller, and the data processing method used thereby, when performing the write command, the stored data associating to the specific pattern is identified based on the identification information recorded in the redundancy bit area of the physical programming unit, without actually writing the data to the physical programming unit, and thereby, the time required for programming the data into the physical programming unit is shortened. In addition, with the memory storage device, the memory controller, and the data processing method used thereby, when performing the read command, the stored data associating to the specific pattern is identified based on the identification information in the redundancy bit area of the physical programming unit to rapidly transmit the predetermined data to the host system, and thus, the time for performing the read command is shortened. The previously described exemplary embodiments of the present invention have the advantages aforementioned, wherein the advantages aforementioned not required in all versions of the present invention.

It will be apparent to those skilled in the art that various modifications and variations can be made to the structure of the present invention without departing from the scope or spirit of the present invention. In view of the foregoing, it is intended that the present invention cover modifications and variations of this invention provided they fall within the scope of the following claims and their equivalents.

What is claimed is:

1. A data processing method for a re-writable non-volatile memory module having a plurality of physical programming units, wherein each of the plurality of physical programming units has a data bit area and a redundancy bit area, the data bit area has a plurality of physical access addresses, a plurality of logical programming units is configured to map to at least a portion of the plurality of physical programming units, and each of the plurality of logical programming units has a plurality of logical access addresses, the data processing method comprising:
  receiving a first write data stream, wherein the first write data stream associates with a first logical access address among the plurality of logical access addresses, and the first logical access address associates with a first logical programming unit among the plurality of logical programming units;
  selecting a first physical programming unit from the plurality of physical programming units;
  determining whether the first write data stream associates with a pattern;
  if the first write data stream does not associate with the pattern, setting identification information corresponding to the first logical access address as a default value, programming the first write data stream into the first logical access address among the plurality of logical access addresses in the data bit area of the first physical programming unit and storing the identification information corresponding to the first logical access address in a predetermined area;
  if the first write data stream associates with the pattern, setting the identification information corresponding to the first logical access address as an identification value corresponding to the pattern, and storing the identification information corresponding to the first logical access address in the predetermined area, wherein the first write data stream is not programmed into the first physical programming unit; and
  mapping the first logical programming unit to the first physical programming unit,
  wherein a step of storing the identification information corresponding to the first logical access address to the predetermined area comprises:
    programming the identification information corresponding to the first logical access address into the redundancy bit area of the first physical access address.

2. The data processing method as recited in claim 1, further comprising:
  receiving a read command from a host system, wherein the read command instructs to read data stored in the first logical access address;
  reading a read data stream associating to the first logical access address and the identification information corresponding to the first logical access address from the first physical programming unit;
  determining whether the identification information corresponding to the first logical access address read from the first physical programming unit is the identification value;
  if the identification information corresponding to the first logical access address read from the first physical programming unit is the identification value, transmitting a predetermined data corresponding to the pattern to the host system; and
  if the identification information corresponding to the first logical access address read from the first physical programming unit is not the identification value, transmitting the read data stream to the host system.

3. The data processing method as recited in claim 1, further comprising:
  determining whether a valid data stream associating to a second logical access address among the plurality of logical access addresses of the first logical programming unit is stored in the re-writable non-volatile memory module;
  if the valid data stream associating to the second logical access address is stored in the re-writable non-volatile memory module, setting the identification information corresponding to the second logical access address as the default value, programming the valid data stream into a second physical access address among the plurality of physical access addresses in the data bit area of the first physical programming unit, and programming the identification information corresponding to the second logical access address into the redundancy bit area of the first physical access address; and
  if the valid data stream associating to the second logical access address is not stored in the re-writable non-volatile memory module, setting the identification corresponding to the second logical access address as the identification value and programming the identification information corresponding to the second logical access address into the redundancy bit area of the first physical access address.

4. The data processing method as recited in claim 1, further comprising:
  receiving a second write data stream, wherein the second write data stream associates with a second logical access address among the plurality of logical access addresses of the first logical programming unit;
  determining whether the second write data stream associates with the pattern;
  if the second write data stream does not associate with the pattern, setting the identification information corresponding to the second logical access address as the default value, programming the second write data stream into the second logical access address among the plurality of logical access addresses in the data bit area of the first physical programming unit and programming the identification information corresponding to the second logical access address into the redundancy bit area of the first physical programming unit; and
  if the second write data stream associates with the pattern, setting the identification information corresponding to the second logical access address as the identification value corresponding to the pattern and programming the identification information corresponding to the second logical access address into the redundancy bit area of the first physical programming unit, wherein the second write data stream is not programmed into the first physical programming unit.

5. The data processing method as recited in claim 4, wherein the first write data stream, the second write data stream, the identification information corresponding to the first logical access address, the identification information corresponding to the second logical access address are programmed into the first physical programming unit by a programming command.

6. The data processing method as recited in claim 1, wherein a step of determining whether the first write data stream associates with the pattern comprises:
  determining whether each data bit of the first write data stream is 0; and
  if each data bit of the first write data stream is 0, identifying that the first write data stream associates with the pattern.

7. A data processing method for a re-writable non-volatile memory module having a plurality of physical programming units, wherein each of the plurality of physical programming units has a data bit area and a redundancy bit area, the data bit area has a plurality of physical access addresses, a plurality of logical programming units is configured to map to a portion of the plurality of physical programming units, and each of the plurality of logical programming units has a plurality of logical access addresses, the data processing method comprising:

receiving a first write data stream, wherein the first write data stream associates with a first logical access address among the plurality of logical access addresses, and the first logical access address associates with a first logical programming unit among the plurality of logical programming units;

selecting a first physical programming unit from the plurality of physical programming units;

determining whether the first write data stream associates with one of a plurality of patterns;

if the first write data stream does not associate with any one of the plurality of patterns, setting identification information corresponding to the first logical access address as a default value, programming the first write data stream into a first physical access address among the plurality of physical access addresses in the data bit area of the first physical programming unit and programming the identification information corresponding to the first logical access address into the redundancy bit area of the first physical programming unit;

if the first write data stream associates with one of the plurality of patterns, setting the identification information corresponding to the first logical access address as an identification value and programming the identification information corresponding to the first logical access address into the redundancy bit area of the first physical programming unit, wherein the first write data stream is not programmed into the first physical programming unit; and mapping the first logical programming unit to the first physical programming unit.

8. The data processing method as recited in claim 7, further comprising:

receiving a read command from a host system, wherein the read command instructs to read data stored in the first logical access address;

reading a read data stream associating to the first logical access address and the identification information corresponding to the first logical access address from the first physical programming unit;

determining whether the identification information corresponding to the first logical access address read from the first physical programming unit is the identification value corresponding to the one of the plurality of patterns;

if the identification information corresponding to the first logical access address read from the first physical programming unit is the identification value corresponding to the one of the plurality of patterns, transmitting a predetermined data corresponding to the one of the plurality of patterns to the host system; and if the identification information corresponding to the first logical access address read from the first physical programming unit is not the identification value corresponding to the one of the plurality of patterns, transmitting the read data stream to the host system.

9. A memory controller for controlling a re-writable non-volatile memory module having a plurality of physical programming units, wherein each of the plurality of physical programming units has a data bit area and a redundancy bit area, the data bit area has a plurality of physical access addresses, the memory controller comprising:

a host interface, configured to be coupled to a host system;

a memory interface, configured to be coupled to a rewritable non-volatile memory module; and a memory management circuit, coupled to the host interface and the rewritable non-volatile memory module and configured to configure a plurality of logical programming units to map to at least a portion of the plurality of physical programming units, wherein each of the plurality of logical programming units has a plurality of logical access addresses, wherein the memory management circuit is further configured to receive a first write data stream from the host system, wherein the first write data stream associates with a first logical access address among the plurality of logical access addresses, and the first logical access address associates with a first logical programming unit among the plurality of logical programming units, wherein the memory management circuit is further configured to select a first physical programming unit from the plurality of physical programming units and determine whether the first write data stream associates with a pattern, wherein if the first write data stream does not associate with the pattern, the memory management circuit is further configured to set identification information corresponding to the first logical access address as a default value, program the first write data stream into a first physical access address among the plurality of physical access addresses in the data bit area of the first physical programming unit and store the identification information corresponding to the first logical access address in a predetermined area, wherein if the first write data stream associates with the pattern, the memory management circuit is further configured to set the identification information corresponding to the first logical access address as an identification value corresponding to the pattern and store the identification information corresponding to the first logical access address in the predetermined area, wherein the first write data stream is not programmed into the first physical programming unit, and wherein the memory management circuit is further configured to map the first logical programming unit to the first physical programming unit, wherein the predetermined area is the redundancy bit area of the first physical programming unit.

10. The memory controller as recited in claim 9, wherein the memory management circuit is further configured to receive a read command from a host system, wherein the read command instructs to read data stored in the first logical access address, wherein the memory management circuit is further configured to read a read data stream associating to the first logical access address and the identification information corresponding to the first logical access address from the first physical programming unit and determine whether the identification information corresponding to the first logical access address read from the first physical programming unit is the identification value, wherein if the identification information corresponding to the first logical access address read from the first physical programming unit is the identification value, the memory management circuit is further configured to transmit a predetermined data corresponding to the pattern to the host system, and wherein if the identification information corresponding to the first logical access address read from the first physical programming unit is not the identification value, the memory management circuit is further configured to transmit the read data stream to the host system.

11. The memory controller as recited in claim 9, wherein the memory management circuit is further configured to determine whether a valid data stream associating to a second logical access address among the plurality of logical access addresses of the first logical programming unit is stored in the re-writable non-volatile memory module, wherein if the valid data stream associating to the second logical access address is stored in the re-writable non-volatile memory module, the memory management circuit is further configured to set the identification information corresponding to the second logical access address as the default value, program the valid data stream into a second physical access address among the plurality of physical access addresses in the data bit area of the first physical programming unit, and program the identification information corresponding to the second logical access address into the redundancy bit area of the first physical access address, and where if the valid data stream associating to the second logical access address is not stored in the re-writable non-volatile memory module, the memory management circuit is further configured to set the identification information corresponding to the second logical access address as the identification value corresponding to the pattern and program the identification information corresponding to the second logical access address into the redundancy bit area of the first physical access address.

12. The memory controller as recited in claim 9, wherein the memory management circuit is further configured to receive a second write data stream from the host system via the host interface, wherein the second write data stream associates with a second logical access address among the plurality of logical access addresses of the first logical programming unit, wherein the memory management circuit is further configured to determine whether the second write data stream associates with the pattern, wherein if the second write data stream does not associate with the pattern, the memory management circuit is further configured to set the identification information corresponding to the second logical access address as the default value, program the second write data stream into the second logical access address among the plurality of logical access addresses in the data bit area of the first physical programming unit and program the identification information corresponding to the second logical access address into the redundancy bit area of the first physical programming unit, and where if the second write data stream associates with the pattern, the memory management circuit is further configured to set the identification information corresponding to the second logical access address as the identification value corresponding to the pattern and program the identification information corresponding to the second logical access address into the redundancy bit area of the first physical programming unit, wherein the second write data stream is not programmed into the first physical programming unit.

13. The memory controller as recited in claim 12, wherein the memory management circuit is further configured to program the first write data stream, the second write data stream, the identification information corresponding to the first logical access address, the identification information corresponding to the second logical access address into the first physical programming unit by using a programming command.

14. The memory controller as recited in claim 9, wherein the memory management circuit is further configured to determine whether each data bit of the first write data stream is 0, and where if each data bit of the first write data stream is 0, the memory management circuit identifies that the first write data stream associates with the pattern.

15. A memory storage device, comprising:

a connector, configured to be coupled to a host system;

a rewritable non-volatile memory module, having a plurality of physical programmed blocks, wherein each of the plurality of physical programming units has a data bit area and a redundancy bit area, and the data bit area has a plurality of physical access addresses; and a memory controller, coupled to the connector and the rewritable non-volatile memory module and configured to configure a plurality of logical programming units to be mapped to at least a portion of the plurality of physical programming units, wherein each of the plurality of logical programming units has a plurality of logical access addresses, wherein the memory controller is further configured to receive a first write data stream from the host system, wherein the first write data stream associates with a first logical access address among the plurality of logical access addresses, and the first logical access address associates with a first logical programming unit among the plurality of logical programming units, wherein the memory controller is further configured to select a first physical programming unit from the plurality of physical programming units and determine whether the first write data stream associates with a pattern, wherein if the first write data stream does not associate with the pattern, the memory controller is further configured to set identification information corresponding to the first logical access address as a default value, program the first write data stream into a first physical access address among the plurality of physical access addresses in the data bit area of the first physical programming unit and store the identification information corresponding to the first logical access address in a predetermined area, wherein if the first write data stream associates with the pattern, the memory controller is further configured to set the identification information corresponding to the first logical access address as an identification value corresponding to the pattern and store the identification information corresponding to the first logical access address in the predetermined area, wherein the first write data stream is not programmed into the first physical programming unit, and wherein the memory controller is further configured to map the first logical programming unit to the first physical programming unit, wherein the predetermined area is the redundancy bit area of the first physical programming unit.

16. The memory storage device as recited in claim 15, wherein the memory controller is further configured to receive a read command from a host system, wherein the read command instructs to read data stored in the first logical access address, wherein the memory controller is further configured to read a read data stream associating to the first logical access address and the identification information corresponding to the first logical access address from the first physical programming unit and determine whether the identification information corresponding to the first logical access address read from the first physical programming unit is the identification value, wherein if the identification information corresponding to the first logical access address read from the first physical programming unit is the identification value, the memory controller is further configured to transmit a predetermined data corresponding to the pattern to the host system, and wherein if the identification information corresponding to the first logical access address read from the first physical programming unit is not the identification value, the memory management circuit is further configured to transmit the read data stream to the host system.

17. The memory storage device as recited in claim 15, wherein the memory controller is further configured to determine whether a valid data stream associating to a second logical access address among the plurality of logical access addresses of the first logical programming unit is stored in the re-writable non-volatile memory module, wherein if the valid data stream associating to the second logical access address is stored in the re-writable non-volatile memory module, the memory controller is further configured to set the identification information corresponding to the second logical access address as the default value, program the valid data stream into a second physical access address among the plurality of physical access addresses in the data bit area of the first physical programming unit, and program the identification information corresponding to the second logical access address into the redundancy bit area of the first physical access address, and where if the valid data stream associating to the second logical access address is not stored in the re-writable non-volatile memory module, the memory controller is further configured to set the identification information corresponding to the second logical access address as the identification value corresponding to the pattern and program the identification information corresponding into the second logical access address to the redundancy bit area of the first physical access address.

18. The memory storage device as recited in claim 15, wherein the memory controller is further configured to receive a second write data stream from the host system via the host interface, wherein the second write data stream associates with a second logical access address among the plurality of logical access addresses of the first logical programming unit, wherein the memory controller is further configured to determine whether the second write data stream associates with the pattern, wherein if the second write data stream does not associate with the pattern, the memory controller is further configured to set the identification information corresponding to the second logical access address as the default value, program the second write data stream into the second logical access address among the plurality of logical access addresses in the data bit area of the first physical programming unit and program the identification information corresponding to the second logical access address into the redundancy bit area of the first physical programming unit, and where if the second write data stream associates with the pattern, the memory management circuit is further configured to set the identification information corresponding to the second logical access address as the identification value corresponding to the pattern and program the identification information corresponding to the second logical access address into the redundancy bit area of the first physical programming unit, wherein the second write data stream is not programmed into the first physical programming unit.

19. The memory storage device as recited in claim 18, wherein the memory controller is further configured to program the first write data stream, the second write data stream, the identification information corresponding to the first logical access address, the identification information corresponding to the second logical access address into the first physical programming unit by using a programming command.

20. The memory storage device as recited in claim 15, wherein the memory controller is further configured to determine whether each data bit of the first write data stream is 0, and where if each data bit of the first write data stream is 0, the memory management circuit identifies that the first write data stream associates with the pattern.

21. A memory storage device, comprising:

a connector, configured to be coupled to a host system;

a rewritable non-volatile memory module, having a plurality of physical programmed blocks, wherein each of the plurality of physical programming units has a data bit area and a redundancy bit area, and the data bit area has a plurality of physical access addresses; and a memory controller, coupled to the connector and the rewritable non-volatile memory module and is configured to configure a plurality of logical programming units to be mapped to a portion of the plurality of physical programming units, wherein each of the plurality of logical programming units has a plurality of logical access addresses, wherein the memory controller is further configured to receive a first write data stream from the host system, wherein the first write data stream associates with a first logical access address among the plurality of logical access addresses, and the first logical access address associates with a first logical programming unit among the plurality of logical programming units, wherein the memory controller is further configured to select a first physical programming unit from the plurality of physical programming units and determine whether the first write data stream associates with a pattern among multiple patterns, wherein if the first write data stream does not associate with any one of the multiple patterns, the memory controller is further configured to set identification information corresponding to the first logical access address as a default value, program the first write data stream into a first physical access address among the plurality of physical access addresses in the data bit area of the first physical programming unit and program the identification information corresponding to the first logical access address into the redundancy bit area of the first physical programming unit;

wherein if the first write data stream associates with one of the multiple patterns, the memory controller is further configured to set the identification information corresponding to the first logical access address as an identification value corresponding to the pattern and program the identification information corresponding to the first logical access address into the redundancy bit area of the first physical programming unit, wherein the first write data stream is not programmed into the first physical programming unit; and wherein the memory controller is further configured to map the first logical programming unit to the first physical programming unit.

22. The memory storage device as recited in claim 21, wherein the memory controller is further configured to receive a read command from the host system, wherein the read command instructs to read data stored in the first logical access address, wherein the memory controller is further configured to read a read data stream associating to the first logical access address and the identification information corresponding to the first logical access address from the first physical programming unit and determine whether the identification info nation corresponding to the first logical access address read from the first physical programming unit is the identification value corresponding to the one of the patterns, wherein if the identification information corresponding to the first logical access address read from the first physical programming unit is the identification value corresponding to the one of the patterns, the memory controller is further configured to transmit a predetermined data corresponding to the one of the patterns to the host system, and wherein if the identification information corresponding to the first logical access address read from the first physical programming unit is not the identification value corresponding to the one of the patterns, the memory controller is further configured to transmit the read data stream to the host system.

23. A data processing method for a re-writable non-volatile memory module having a plurality of physical programming units, wherein each of the plurality of physical programming units has a data bit area and a redundancy bit area, the data bit area has a plurality of physical access addresses, a plurality of logical programming units is configured to be mapped to at least a portion of the plurality of physical programming units, and each of the plurality of logical programming units has a plurality of logical access addresses, the data processing method comprising, receiving a read command from a host system, wherein the read command instructs to read data stored in a first logical access address among the plurality of logical access addresses;

reading identification information corresponding to the first logical access address from a predetermined area;

determining whether the identification information is an identification value;

transmitting a predetermined data to the host system if the read identification information is the identification value; and transmitting a data stream read from a physical access address mapped to the first logical access address to the host system if the identification information is not the identification value, wherein the number of bits of the identification value is smaller than the number of bits of the predetermined data, wherein the predetermined area is the redundancy bit area of the first physical programming unit.

* * * * *